(12) United States Patent
Daehler et al.

(10) Patent No.: US 7,064,460 B2
(45) Date of Patent: Jun. 20, 2006

(54) METHOD FOR BALANCING A THREE-POINT DC INTERMEDIATE CIRCUIT, AND AN APPARATUS FOR CARRYING OUT THE METHOD

(75) Inventors: Peter Daehler, Remigen (CH); Ralf Baechle, Weilheim (DE)

(73) Assignee: ABB Schweiz AG, Baden (CH)

( * ) Notice: Subject to any disclaimer, the term of this patent is extended or adjusted under 35 U.S.C. 154(b) by 497 days.

(21) Appl. No.: 10/293,278

(22) Filed: Nov. 14, 2002

(65) Prior Publication Data

US 2003/0098617 A1    May 29, 2003

(30) Foreign Application Priority Data

Nov. 23, 2001    (EP)    ................... 01811130

(51) Int. Cl.
*H02M 3/06*    (2006.01)
*H01H 47/00*   (2006.01)
*H01H 83/12*   (2006.01)
*H01H 83/14*   (2006.01)
*H01H 85/46*   (2006.01)
*H02B 1/24*    (2006.01)

(52) U.S. Cl. ................. 307/109; 307/115; 307/130
(58) Field of Classification Search ................ 307/109
See application file for complete search history.

(56) References Cited

U.S. PATENT DOCUMENTS

RE31,208  E  *  4/1983   Watanabe .................. 700/250
5,621,628  A     4/1997   Miyazaki et al. ............. 363/37

FOREIGN PATENT DOCUMENTS

EP            0534242 A1    3/1993

* cited by examiner

*Primary Examiner*—Brian Sircus
*Assistant Examiner*—Hal I. Kaplan
(74) *Attorney, Agent, or Firm*—Buchanan Ingersoll PC

(57)    ABSTRACT

A method and apparatus for balancing a three point DC voltage intermediate circuit involves a converter circuit which influences an electrical power flow in a three point DC voltage intermediate circuit. An intermediate circuit voltage mean value is formed from a first intermediate circuit voltage across a first capacitor, and from a second intermediate circuit voltage across a second capacitor. Based on an intermediate circuit voltage mean value exceeding a threshold value, the first capacitor is connected by means of the converter circuit to an energy store, and the energy store is then connected by means of the converter circuit to the second capacitor. If the threshold value is significantly undershot, the second capacitor is connected to the energy store by means of the converter circuit, and the energy store is then connected to the first capacitor by means of the converter circuit.

15 Claims, 2 Drawing Sheets

METHOD FOR BALANCING A THREE-POINT DC INTERMEDIATE CIRCUIT, AND AN APPARATUS FOR CARRYING OUT THE METHOD

FIELD OF THE INVENTION

The invention relates to the field of power electronics and is based on a method for balancing a three-point DC voltage intermediate circuit, and an apparatus for carrying out the method as claimed in the precharacterizing clause of the independent claims.

BACKGROUND OF THE INVENTION

Two-pole DC voltage sources with a variable DC voltage on the output side are known, for example, from fuel cell applications, in which the fuel cell represents such a DC voltage source with a variable DC voltage. Normally, such a DC voltage source supplies a three-point DC voltage intermediate circuit owing to the different DC voltage level, which three-point DC voltage intermediate circuit is formed by a first capacitor and a second capacitor connected in series with it. One connection of the first capacitor also forms an upper connection of the three-point DC voltage intermediate circuit, and one connection of the second capacitor forms a lower connection of the three-point DC voltage intermediate circuit. A center point connection of the three-point DC voltage intermediate circuit is also formed at the point at which the first capacitor is connected to the second capacitor. A converter circuit is normally connected to the upper connection, to the center connection and to the lower connection of the three-point DC voltage intermediate circuit, and the electronic switches in this converter circuit are driven by a drive circuit.

A converter circuit such as this having a DC voltage source with a variable DC voltage and a three-point DC voltage intermediate circuit connected to the converter circuit is specified in EP 01810944.7, which has not yet been published. A converter is provided for coupling to an electrical DC voltage supply network, and is connected on the DC voltage side to the three-point DC voltage intermediate circuit and on the AC voltage side to the electrical AC voltage supply network, in particular via a transformer. If a first intermediate circuit voltage across the first capacitor is not equal to a second intermediate circuit voltage across the second capacitor, the converter circuit is driven such that both the first and the second intermediate circuit voltages are set to an intermediate circuit voltage nominal value by regulation. First of all, for this purpose, an intermediate circuit voltage mean value is formed from the first intermediate circuit voltage and from the second intermediate circuit voltage, and this mean value is then regulated at the intermediate circuit voltage nominal value. However, this regulation process is dependent on the converter circuit being able to draw electrical power from the DC voltage source, that is to say the DC voltage source must continuously supply electrical power for the regulation process and, accordingly, is required to compensate for the abovementioned inequality. If the DC voltage source fails, such compensation is, however, no longer ensured. If, furthermore, the converter is used as a pure power factor corrector for the electrical AC voltage supply network and an inequality occurs in the three-point DC voltage intermediate circuit as described above, then this imbalance can be compensated for only in the manner described above, provided the converter circuit can draw electrical power from the DC voltage source, that is to say the DC voltage source continuously supplies electrical power for the regulation process.

SUMMARY OF THE INVENTION

The object of the invention is therefore to specify a method for balancing a three-point DC voltage intermediate circuit, by means of which inequalities in the voltages across the capacitors in the three-point DC voltage intermediate circuit can be compensated for in a simple manner and without including any additional electrical power source. Furthermore, an apparatus will be specified, by means of which the method for balancing the three-point DC voltage intermediate circuit can be carried out in a particularly simple manner. These objects are achieved by the features of claims 1 and 7. Further developments of the invention are specified in the dependent claims.

In the method according to the invention for balancing a three-point DC voltage intermediate circuit, the flow of electrical power in the three-point DC voltage intermediate circuit is influenced by means of a converter circuit, which is connected to a first capacitor and to a second capacitor in the three-point DC voltage intermediate circuit. Furthermore, an intermediate circuit voltage mean value is formed from a first intermediate circuit voltage, which is present across the first capacitor, and from a second intermediate circuit voltage, which is present across the second capacitor, and, according to the invention, this mean value is monitored for a threshold value which can be predetermined. If the intermediate circuit voltage mean value significantly exceeds the threshold value, the first capacitor is connected by means of the converter circuit to an energy store, and the energy store is then connected by means of the converter circuit to the second capacitor. The connection of the first capacitor to the energy store results in power flowing from the first capacitor to the energy store, thus reducing the first intermediate circuit voltage across the first capacitor. The subsequent connection of the energy store to the second capacitor results in power flowing from the energy store to the second capacitor, thus increasing the intermediate circuit voltage across the second capacitor. Overall, the first intermediate circuit voltage and the second intermediate circuit voltage are matched to one another, in which case there is advantageously no need to draw electrical power from an additional electrical power source, as is known from the prior art, in order to compensate for inequalities between the two intermediate circuit voltages.

If, furthermore, the intermediate circuit voltage mean value significantly undershoots the threshold value, then the second capacitor is connected by means of the converter circuit to the energy store, and the energy store is then connected by means of the converter circuit to the first capacitor. The connection of the second capacitor to the energy store results in power flowing from the second capacitor to the energy store, thus reducing the second intermediate circuit voltage. The subsequent connection of the energy store to the first capacitor results in power flowing from the energy store to the first capacitor, thus increasing the first intermediate circuit voltage. The first intermediate circuit voltage and the second intermediate circuit voltage are also matched to one another in this situation, in which case there is likewise advantageously no need to draw electrical power from an additional electrical power source, which is known from the prior art, in order to compensate for these inequalities between the two intermediate circuit voltages.

The apparatus according to the invention for carrying out the method for balancing a three-point DC voltage intermediate circuit has a converter circuit which is connected to the first capacitor and to the second capacitor. Furthermore, a drive circuit is provided, which has a mean value forming device for forming the intermediate circuit voltage mean value from the first intermediate circuit voltage and from the second intermediate circuit voltage, with the converter circuit being connected to the drive circuit. According to the invention, the drive circuit has a monitoring device for monitoring the intermediate circuit voltage mean value for a threshold value which can be predetermined, with the monitoring device being connected to the mean value forming device. Furthermore, the converter circuit has a first drivable switch and a second drivable switch, with an energy store being provided which is connected to the first switch and to the second switch. In addition, the first switch and the second switch are connected to the drive circuit, in which case the first switch and the second switch can be connected to the first capacitor and to the second capacitor. The apparatus according to the invention advantageously makes it possible to compensate for imbalances in the three-point DC voltage intermediate circuit, that is to say for inequalities between the two intermediate circuit voltages, with the first switch and the second switch in particular ensuring that the connection between the first capacitor and the energy store as well as the connection between the second capacitor and the energy store can be produced in a very simple manner. Furthermore, there is advantageously no need for either an additional electrical power source, which would have to provide electrical power for regulation (as is known from the prior art) of the two intermediate circuit voltages at an appropriate intermediate circuit voltage nominal value, or for a complex and complicated drive circuit for the regulation process mentioned above. In addition, the apparatus according to the invention requires a minimal number of components and can be produced with a low level of circuit complexity. Moreover, the apparatus according to the invention is very convenient to maintain and to repair owing to its simple construction and the small number of components. Accordingly, overall, the method according to the invention can be implemented in a particularly simple manner by means of the apparatus according to the invention.

These and further objects, advantages and features of the present invention will become evident from the following detailed description of preferred exemplary embodiments of the invention in conjunction with the drawings.

Figure 1:
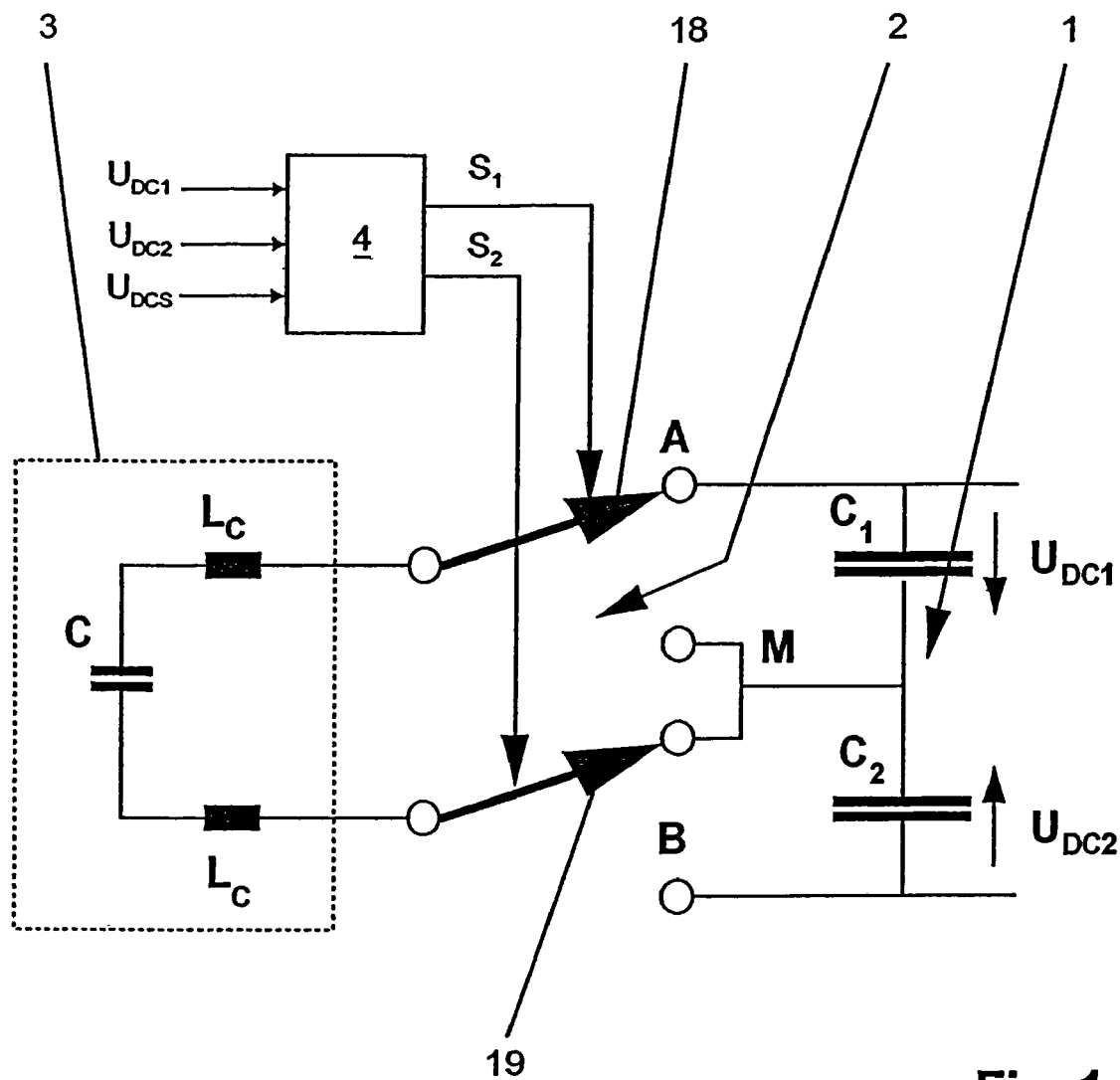
FIG. 1 shows an embodiment of an apparatus according to the invention for carrying out a method for balancing a three-point DC voltage intermediate circuit.

The reference symbols used in the drawing and their meanings are listed in summary form in the list of reference symbols. In principle, identical parts are provided with the same reference symbols in the figures. The described embodiments represent examples of the subject matter of the invention and have no restrictive effect.

DETAILED DESCRIPTION OF THE INVENTION

FIG. 1 shows a first embodiment of an apparatus according to the invention for carrying out a method for balancing a three-point DC voltage intermediate circuit 1. The apparatus has a converter circuit 2, which is connected to a first capacitor $C_1$ and a second capacitor $C_2$. As shown in FIG. 1, the two capacitors $C_1$, $C_2$ are connected in series, with the capacitors $C_1$, $C_2$ forming a connection M at the point at which they are connected to one another. Furthermore, the first capacitor $C_1$ has a connection A and the second capacitor $C_2$ has a connection B. In addition, a drive circuit 4 is provided, which is connected to the converter circuit 2.

In the method according to the invention for balancing a three-point DC voltage intermediate circuit, the flow of electrical power in the three-point DC voltage intermediate circuit 1 is influenced by means of the converter circuit 2. An intermediate circuit voltage mean value $\overline{U_{DC}}$ is, furthermore, formed from a first intermediate circuit voltage $U_{DC1}$, which is present across the first capacitor $C_1$, and from a second intermediate circuit voltage $U_{DC2}$, which is present across the second capacitor $C_2$, and this mean value is, according to the invention, monitored for a threshold value $U_{DCS}$ which can be predetermined. The threshold value $U_{DCS}$ is preferably chosen to be in the order of magnitude of zero. As shown in FIG. 1, the first intermediate circuit voltage $U_{DC1}$ is obtained between the connection A of the first capacitor $C_1$ and the connection M, and the second intermediate circuit voltage $U_{DC2}$ is obtained between the connection B of the second capacitor $C_2$ and the connection M. The intermediate circuit voltage mean value $\overline{U_{DC}}$ is preferably formed in accordance with the formula:

$$\overline{U_{DC}} = \frac{U_{DC1} + U_{DC2}}{2}$$

so that, while the three-point DC voltage intermediate circuit 1 is in the balanced state, that is to say when the two intermediate circuit voltages $U_{DC1}$, $U_{DC2}$ are essentially the same, this results in an intermediate circuit voltage value $\overline{U_{DC}}$ of essentially zero.

Figure 2:
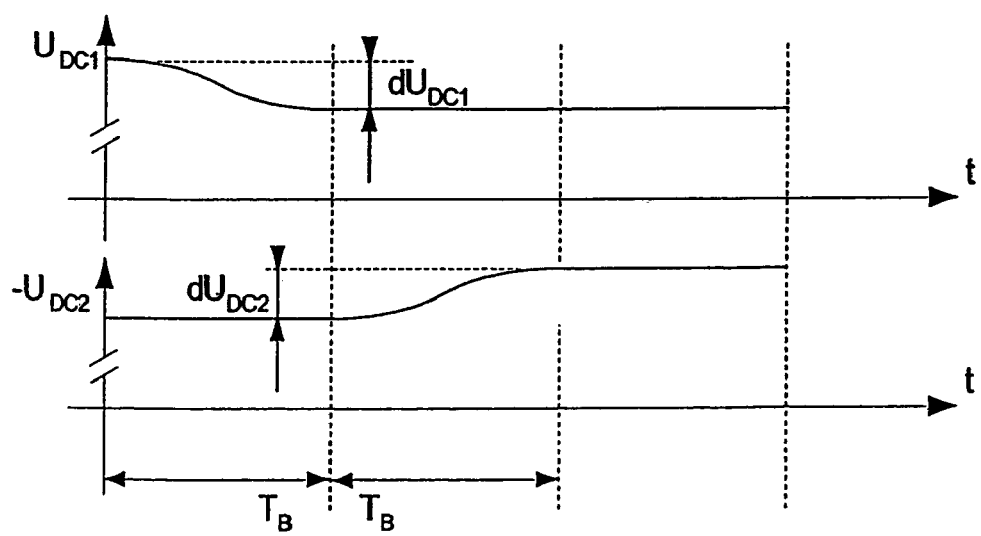
FIG. 2 shows a voltage profile across a first and a second capacitor in the three-point DC voltage intermediate circuit for balancing in accordance with the method according to the invention.

If the intermediate circuit voltage mean value $\overline{U_{DC}}$ now significantly exceeds the threshold value $U_{DCS}$, that is to say the first intermediate circuit voltage $U_{DC1}$ is greater than the second intermediate circuit voltage $U_{DC2}$, then the first capacitor $C_1$ is connected by means of the converter circuit 2 to an energy store 3. The energy store 3 is then connected by means of the converter circuit 2 to the second capacitor $C_2$. If a capacitor with the value C is chosen for the energy store 3, where C is considerably less than the capacitance of the first capacitor $C_1$ and of the second capacitor $C_2$, then the energy store 3 will be essentially discharged before the already described connection for the first capacitor $C_1$ and, after this connection, will be charged essentially to a value of twice the first intermediate circuit voltage $U_{DC1}$. The connection of the first capacitor $C_1$ to the energy store 3 thus results in power flowing from the first capacitor $C_1$ to the energy store 3, thus reducing the first intermediate circuit voltage $U_{DC1}$ by a value $dU_{DC1}$. The subsequent connection of the energy store 3 to the second capacitor $C_2$ results in a power flow from the energy store 3 to the second capacitor $C_2$, as a result of which the second intermediate circuit voltage $U_{DC2}$ is increased by a value $dU_{DC2}$. FIG. 2 shows a voltage profile across the first and second capacitors $C_1$, $C_2$ of the three-point DC voltage intermediate circuit 1 during balancing using the method according to the invention, in the situation where the intermediate circuit voltage mean value $\overline{U_{DC}}$ has significantly exceeded the threshold value $U_{DCS}$.

The connection of the first capacitor $C_1$ to the energy store 3 and the subsequent connection of the energy store 3 to the second capacitor $C_2$ result in the first intermediate circuit voltage $U_{DC1}$ and the second intermediate circuit voltage $U_{DC2}$ being matched to one another, which advantageously means that there is no need to compensate for these inequalities between the two intermediate circuit voltages $U_{DC1}$, $U_{DC2}$ by drawing electrical power from an additional electrical power source, which is known from the prior art.

If the intermediate circuit voltage mean value $\overline{U_{DC}}$ is still significantly greater than the threshold value $U_{DCS}$ after the switching processes described above have taken place in the converter circuit 2, the first capacitor $C_1$ is once again connected by means of the converter circuit 2 to the energy store 3 for the time $T_B$ which can be predetermined, and the energy store 3 is then connected to the second capacitor $C_2$ for the time $T_B$ which can be predetermined. This process is repeated until the intermediate circuit voltage mean value $\overline{U_{DC}}$ essentially matches the threshold value $U_{DCS}$. When this essential match occurs, that is to say when the inequalities which occur in the three-point DC voltage intermediate circuit 1 are essentially compensated for, then the energy store 3 is, according to the invention, connected by means of the converter circuit 2 to the connection M.

As shown in FIG. 2, the first capacitor $C_1$ is connected to the energy store 3, and the energy store 3 is then connected to the second capacitor $C_2$, advantageously in each case within a time $T_B$ which can be predetermined. The time $T_B$ which can be predetermined is defined as a function of the values of the first capacitor $C_1$, of the second capacitor $C_2$ and of the energy store 3. The time $T_B$ which can be predetermined is preferably defined in accordance with the formula:

$$T_B = \Pi \cdot \sqrt{2L_c \cdot \frac{C \cdot \frac{C_1 + C_2}{2}}{C + \frac{C_1 + C_2}{2}}}$$

where C is a capacitor in the energy store 3 and $L_C$ is an inductance in the energy store 3, as shown in FIG. 1.

If the intermediate circuit voltage mean value $\overline{U_{DC}}$ significantly undershoots the threshold value $U_{DCS}$, that is to say the second intermediate circuit voltage $U_{DC2}$ is greater than the first intermediate circuit voltage $U_{DC1}$, then, in accordance with the method according to the invention, the second capacitor $C_2$ is connected by means of the converter circuit 2 to the energy store 3, and the energy store 3 is then connected by means of the converter circuit 2 to the first capacitor $C_1$. The connection of the second capacitor $C_2$ to the energy store 3 results in a power flow from the second capacitor $C_2$ to the energy store 3, as a result of which the second intermediate circuit voltage $U_{DC2}$ is reduced by a value $dU_{DC2}$, in a similar way to that shown in FIG. 2 for the first intermediate circuit voltage $U_{DC1}$. The subsequent connection of the energy store 3 to the first capacitor $C_1$ results in power flowing from the energy store 3 to the first capacitor $C_1$, as a result of which the first intermediate circuit voltage $U_{DC1}$ is increased by a value $dU_{DC1}$, in a similar way to that shown in FIG. 2 for the second intermediate circuit voltage $U_{DC2}$. The first intermediate circuit voltage $U_{DC1}$ and the second intermediate circuit voltage $U_{DC2}$ are also advantageously matched to one another for this situation.

In an analogous manner to that described above with reference to FIG. 2, for the intermediate circuit voltage mean value $\overline{U_{DC}}$ which significantly exceeds the threshold value $U_{DCS}$, the first capacitor $C_1$ is advantageously connected to the energy store 3, and the energy store 3 is then connected to the second capacitor $C_2$, likewise in each case within the time $T_B$ which can be predetermined. The time $T_B$ which can be predetermined is defined as a function of the values of the first capacitor $C_1$, of the second capacitor $C_2$ and of the energy store 3, in which case the formula specified above likewise applies to the time $T_B$ which can be predetermined.

If the intermediate circuit voltage mean value $\overline{U_{DC}}$ is still significantly below the threshold value $U_{DCS}$ after the switching processes, as described above, have been carried out in the converter circuit 2, then the second capacitor $C_2$ is once again connected by means of the converter circuit 2 for the time $T_B$, which can be predetermined, to the energy store 3, which is then connected to the first capacitor $C_1$ for the time $T_B$ which can be predetermined. This process is repeated until the intermediate circuit voltage mean value $\overline{U_{DC}}$ essentially matches the threshold value $U_{DCS}$. When this essential match occurs, that is to say when the inequalities which occur in the three-point DC voltage intermediate circuit are essentially compensated for, the energy source 3 is, according to the invention, connected by means of the converter circuit 2 to the connection M. This means that any residual charge which may still possibly remain in it can be reliably discharged from the energy store 3.

Overall, the method according to the invention for balancing the three-point DC voltage intermediate circuit 1 represents a particularly simple and cost-effective solution, by means of which inequalities in the intermediate circuit voltages $U_{DC1}$, $U_{DC2}$ across the capacitors $C_1$, $C_2$ in the three-point DC voltage intermediate circuit 1 can advantageously be compensated for in a simple manner, and without involving any additional electrical power source. If the converter circuit 2 together with the energy store 3 is coupled via the three-point DC voltage intermediate circuit 1 to a converter which is intended to be used as a power factor compensator for an electrical AC voltage supply network, then the method according to the invention as described above can advantageously be used for balancing the three-point DC voltage intermediate circuit 1 if any inequalities occur between the two intermediate circuit voltages $U_{DC1}$, $U_{DC2}$ during this use. It is self-evident that the method according to the invention for balancing the three-point DC voltage intermediate circuit 1 can be used generally for those applications where inequalities can occur between the two intermediate circuit voltages $U_{DC1}$, $U_{DC2}$ in the three-point DC voltage intermediate circuit 1.

The apparatus according to the invention for carrying out the method for balancing a three point DC voltage intermediate circuit 1 has, as already mentioned, the converter circuit 2, which is connected to the first capacitor $C_1$ and to the second capacitor $C_2$. Furthermore, the already mentioned drive circuit 4 is provided. In addition, the converter circuit 2 has a first drivable switch 18 and a second drivable switch 19, with the already mentioned energy store 3 being connected to the first switch 18 and to the second switch 19. The first drivable switch 18 and the second drivable switch 19 advantageously have power semiconductor switches, with each power semiconductor switch preferably having an integrated drive-electrode-commutated thyristor or a bipolar transistor with a drive electrode arranged in an isolated manner, or have a metal oxide field-effect transistor. Furthermore, the first switch 18 and the second switch 19 are connected to the drive circuit, in which case the first switch 18 and the second switch 19 can be connected to the first capacitor $C_1$ and to the second capacitor $C_2$ in response to operating signals $S_1$, $S_2$ from the drive circuit 4.

Figure 3:
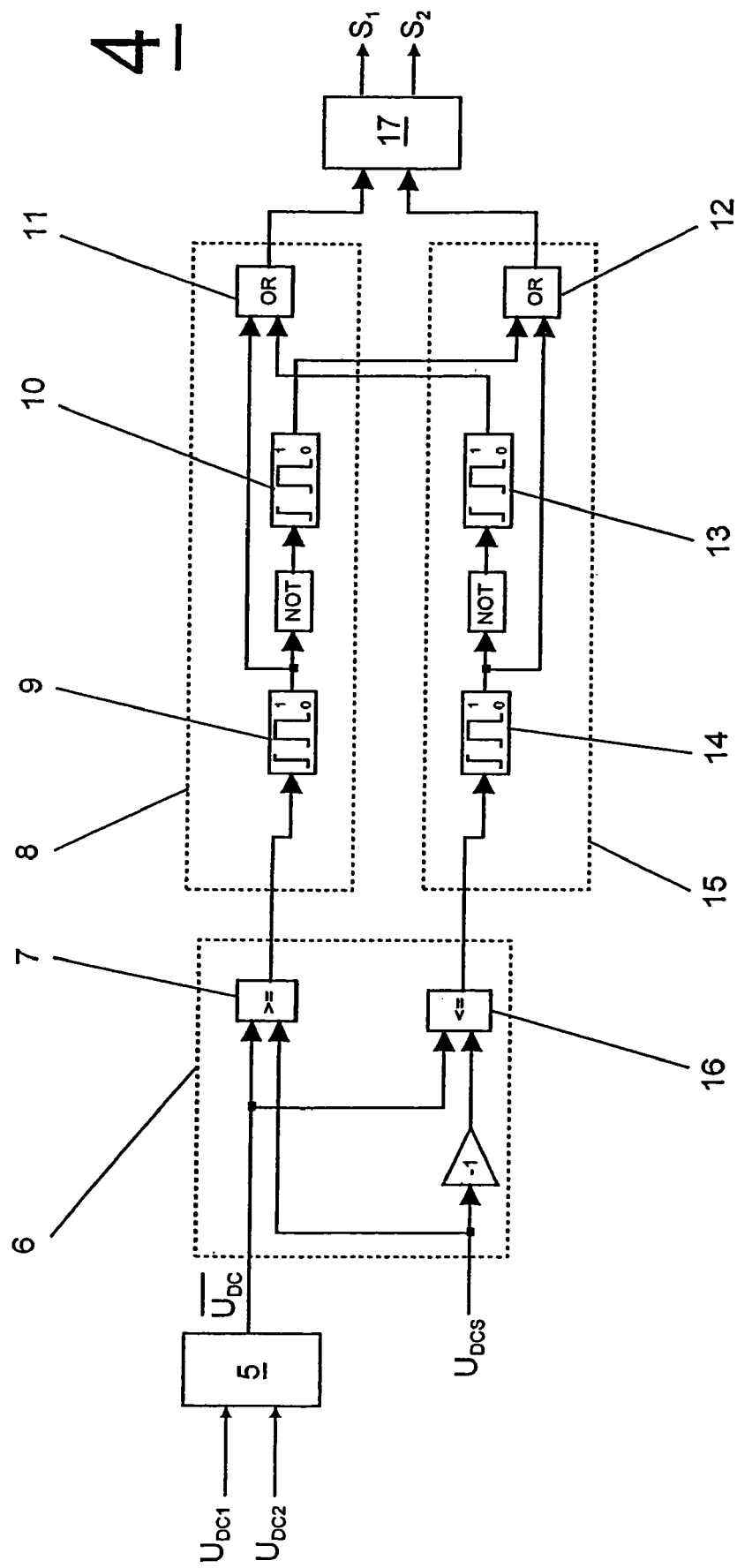
FIG. 3 shows an embodiment of a drive circuit for an apparatus according to the invention.

The drive circuit 4 will be described in more detail in the following text with reference to an embodiment illustrated in FIG. 3. As shown in FIG. 3, the drive circuit 4 has a mean value forming device 5 for forming the intermediate circuit voltage mean value $\overline{U_{DC}}$ from the first intermediate circuit voltage $U_{DC1}$ and from the second intermediate circuit voltage $U_{DC2}$. The input side of the mean value forming device 5 is for this purpose supplied with the two intermediate circuit voltages $U_{DC1}$, $U_{DC2}$, with the intermediate circuit voltage mean value $\overline{U_{DC}}$ formed in accordance with the already mentioned formula being produced at the output of the mean value forming device 5. According to the invention, the drive circuit 4 as shown in FIG. 3 has a monitoring device 6 for monitoring the intermediate circuit voltage mean value $\overline{U_{DC}}$ for the threshold value $U_{DCS}$ which can be predetermined, with the monitoring device 6 being connected to the mean value forming device 5, by which means the monitoring device 6 is supplied with the intermediate circuit voltage mean value $\overline{U_{DC}}$. Furthermore, the input side of the monitoring device 6 is supplied with the threshold value $U_{DCS}$ which can be predetermined. The monitoring device 6 has a first comparator 7 and a second comparator 16, with the first comparator 7 being supplied with the intermediate circuit voltage mean value $\overline{U_{DC}}$ and with the threshold value $U_{DCS}$ which can be predetermined, and with the second comparator 16 being supplied with the intermediate circuit voltage mean value $\overline{U_{DC}}$ and the threshold value $U_{DCS}$, which can be predetermined, as an inverted value. If the intermediate circuit voltage mean value $\overline{U_{DC}}$ is greater than the threshold value $U_{DCS}$ which can be predetermined then a logic "1" is produced at the output of the first comparator 7, otherwise a logic "0" is produced. If the intermediate circuit voltage mean value $\overline{U_{DC}}$ is less than the threshold value $U_{DCS}$ which can be predetermined, then a logic "1" is produced at the output of the second comparator 16, otherwise a logic "0" is produced.

Exceeding or undershooting of the intermediate circuit voltage mean value $\overline{U_{DC}}$ with respect to the threshold value $U_{DCS}$ which can be predetermined can be detected in a very simple manner by means of the drive circuit 4, in particular by means of the two comparators 7, 16, for which purpose, furthermore, only a small amount of component complexity is required.

According to FIG. 3, the drive circuit 4 furthermore has a first switching state output device 8 and a second switching state output device 15, with the first switching state output device 8 being connected to the output of the first comparator 7, and the second switching state output device 15 being connected to the output of the second comparator 16. The first switching state output device 8 also has a first monostable multivibrator 9 and a second monostable multivibrator 10. The second switching state output device 15 furthermore has a first monostable multivibrator 14 and a second monostable multivibrator 13. All the monostable multivibrators 9, 10, 13, 14 respond to an input-side signal with a positive flank, and are designed such that they are in an unstable state, that is to say in the logic "1" state as shown in FIG. 3, for the time $T_B$, which can be predetermined, after they respond, and then switched to a stable state, that is to say to the logic "0" state shown in FIG. 3. The time $T_B$, which can be predetermined, can be defined as a function of the values of the first capacitor $C_1$, of the second capacitor $C_2$ and of the energy store 3, in which case the formula specified above applies to the time $T_B$ which can be predetermined.

As shown in FIG. 3, the first monostable multivibrator 9 in the first switching state output device 8 is connected to the first comparator 7, and the first monostable multivibrator 14 in the second switching state output device 15 is connected to the second comparator 16. Furthermore, the output of the first monostable multivibrator 9 in the first switching state output device 8 can be connected indirectly, that is to say via an inverter as shown in FIG. 3, to the second monostable multivibrator 10 in the first switching state output device 8. In addition, the output of the first monostable multivibrator 9 in the first switching state output device 8 is connected to an OR logic circuit 11 in the first switching state output device 8. As shown in FIG. 3, the output of the first monostable multivibrator 14 in the second switching state output device 15 can be connected indirectly, that is to say via an inverter as shown in FIG. 3, to the second monostable multivibrator 13 in the second switching state output device 15. Furthermore, the output of the first monostable multivibrator 14 in the second switching state output device 15 is connected to an OR logic circuit 12 in the second switching state output device 15. The output of the second monostable multivibrator 10 in the first switching state output device 8 is, as shown in FIG. 3, connected to the OR logic circuit 12 in the second switching state output device 15. Furthermore, the output of the second monostable multivibrator 13 in the second switching state output device 15 is connected, as shown in FIG. 3, to the OR logic circuit 11 in the first switching state output device 8. In addition, the drive circuit 4 as shown in FIG. 3 has an operating device 17, which is used for operating the first switch 18 and the second switch 19, and which, as shown in FIG. 1, is connected to the two switches 18, 19. As shown in FIG. 3, the input of the operating device 17 is connected to the output of the OR logic circuit 11 in the first switching state output device 8, and to the output of the OR logic circuit 12 in the second switching state output device 15. The already mentioned operating signals $S_1$, $S_2$ are also produced in the output of the operating device, in which case, as already mentioned, the first switch 18 and the second switch 19 can be connected to the first capacitor $C_1$ and to the second capacitor $C_2$ in response to operating signals $S_1$, $S_2$ from the operating device 17 in the drive circuit 4.

The time $T_B$ which can be predetermined and for which the connections described above between the capacitors $C_1$, $C_2$ and the energy store 3 are intended to be produced can be set and implemented very easily by means of the switching state output devices 8, 15, in particular by means of the multivibrators 9, 10, 13, 14. Furthermore, the OR logic circuit 11 in the first switching state output device 8 and the OR logic circuit 12 in the second switching state output device 15 make it simple to produce logic signals from which switching states of the switches 18, 19 in the converter circuit 2 can be derived on the basis of the signal combinations described below, with the operating device 17 using these to generate the appropriate operating signals $S_1$, $S_2$.

The operation of the drive circuit 4, in particular the generation of the operating signals $S_1$, $S_2$ by the operating device 17, will be described in detail in the following text with reference to FIG. 3 and FIG. 1. If the monitoring device detects that the intermediate circuit voltage mean value $\overline{U_{DC}}$ has exceeded the threshold value $U_{DCS}$ which can be predetermined, then the OR logic circuit 11 in the first switching state output device 8 emits logic "1" for the time $T_B$, and the OR logic circuit 12 in the second switching state output device 15 emits logic "0" for the time $T_B$. This output from the two OR logic circuits 11, 12 results in the operating device 17 generating a first operating signal $S_1$ such that the first switch 18 is connected to the connection A. Furthermore, a second operating signal $S_2$ is generated by the operating device 17 in such a way that the second switch 19 is connected to the connection M. The desired connection is accordingly produced between the capacitor $C_1$ and the energy store 3. After this, the OR logic circuit 11 in the first switching state output device 8 emits a logic "0" for the time $T_B$, and the OR logic circuit 12 in the second switching state output device 15 emits a logic "1". In response to this output from the two OR logic circuits 11, 12, the first operating signal $S_1$ is generated by the operating device 17 such that the first switch 18 is connected to the connection M. Furthermore, the second operating signal $S_2$ is generated such that the second switch 19 is connected to the connection B. This results in the desired connection between the energy store 3 and the capacitor $C_2$.

If, on the other hand, the monitoring device detects the intermediate circuit mean value $\overline{U_{DC}}$ has undershot the threshold value $U_{DCS}$ which can be predetermined, then the OR logic circuit 11 in the first switching state output device 8 emits a logic "0" for the time $T_B$, and the OR logic circuit 12 in the second switching state output device 15 emits a logic "1". In response to this output from the two OR logic circuits 11, 12, the first operating signal $S_1$ is generated in such a way that the first switch 18 is connected to the connection M. Furthermore, the second operating signal $S_2$ is generated in such a way that the second switch 19 is connected to the connection B. The desired connection is accordingly produced between the capacitor $C_2$ and the energy store 3. After this, the OR logic circuit 11 in the first switching state output device 8 outputs a logic "1" for the time $T_B$, and the OR logic circuit 12 in the second switching state output device 15 outputs a logic "0". In response to this output from the two OR logic circuits 11, 12, the first operating signal $S_1$ is generated in such a way that the first switch 18 is connected to the connection A, and the second operating signal $S_2$ is generated in such a way that the second switch 19 is connected to the connection M. This results in the desired connection between the energy store 3 and the capacitor $C_1$.

If the intermediate circuit voltage mean value $\overline{U_{DC}}$ essentially matches the threshold value $U_{DCS}$, that is to say if the inequalities which occur in the three-point DC voltage intermediate circuit are essentially compensated for, the OR logic circuit 11 in the first switching state output device 8 outputs a logic "1", and the OR logic circuit 12 in the second switching state output device 15 outputs a logic "1", or the OR logic circuit 11 in the first switching state output device 8 outputs a logic "0" and the OR logic circuit 12 in the second switching state output device 15 outputs a logic "0". In response to these two output options from the two OR logic circuits 11, 12, the first operating signal $S_1$ and the second operating circuit $S_2$ are generated in such a way that the first switch 18 and the second switch are connected to the connection M. The energy store 3 is thus connected to the connection M to the desired extent.

Overall, the apparatus according to the invention represents an extremely cost-effective solution, since it requires a minimum number of components and can thus be implemented easily, while complex maintenance and repair tasks can be reduced. Furthermore, it is advantageously possible by means of the apparatus according to the invention to compensate for imbalances in the three-point DC voltage intermediate circuit in a very simple manner, in particular with the switches 18, 19, which are connected to the drive circuit 4, for the converter circuit 2 ensuring that the connections mentioned above can be produced easily and without any problems. The apparatus according to the invention accordingly allows the method according to the invention to be implemented in a particularly simple manner.

LIST OF REFERENCE SYMBOLS

1 Three-point DC voltage intermediate circuit
2 Converter circuit
3 Energy store
4 Drive circuit
5 Mean value forming device
6 Monitoring device
7 First comparator
8 First switching state output device
9 First monostable multivibrator in the first switching state output device
10 Second monostable multivibrator in the first switching state output device
11 OR logic circuit in the first switching state output device
12 OR logic circuit in the second switching state output device
13 Second monostable multivibrator in the second switching state output device
14 First monostable multivibrator in the second switching state output device
15 Second switching state output device
16 Second comparator
17 Operating device
18 First switch
19 Second switch

The invention claimed is:

1. A method for balancing a three-point DC voltage intermediate circuit, in which a converter circuit, which is connected to a first capacitor ($C_1$) and to a second capacitor ($C_2$) in the three-point DC voltage intermediate circuit, influences the electrical power flow in the three-point DC voltage intermediate circuit, and in which an intermediate circuit voltage mean value ($\overline{U_{DC}}$) is formed from a first intermediate circuit voltage ($U_{DC1}$), which is present across the first capacitor ($C_1$), and from a second intermediate circuit voltage ($U_{DC2}$), which is present across the second capacitor ($C_2$), wherein the intermediate circuit voltage mean value ($\overline{U_{DC}}$) is monitored for a threshold value ($U_{DCS}$) which can be predetermined, in that, if the threshold value ($U_{DCS}$) is exceeded, the first capacitor ($C_1$) is connected by means of the converter circuit to an energy store, and the energy store is then connected by means of the converter circuit to the second capacitor ($C_2$), and in that if the threshold value ($U_{DCS}$) is undershot, the second capacitor ($C_2$) is connected to the energy store by means of the converter circuit, and the energy store is then connected to the first capacitor ($C_1$) by means of the converter circuit.

2. The method as claimed in claim 1, wherein, if the threshold value ($U_{DCS}$) is exceeded, the first capacitor ($C_1$) is connected to the energy store, and the energy store is then connected to the second capacitor ($C_2$), in each case within a time ($T_B$) which can be predetermined.

3. The method as claimed in claim 1, wherein, if the threshold value ($U_{DCS}$) is undershot, the second capacitor ($C_2$) is connected to the energy store, and the energy store is then connected to the first capacitor ($C_1$), in each case within a time ($T_B$) which can be predetermined.

4. The method as claimed in claim 2, wherein the time ($T_B$) which can be predetermined is defined as a function of the values of the first capacitor ($C_1$), of the second capacitor ($C_2$) and of the energy store.

5. The method as claimed in claim 4, wherein the time ($T_B$) which can be predetermined is defined in accordance with the formula:

$$T_B = \Pi \cdot \sqrt{2L_c \cdot \frac{C \cdot \frac{C_1 + C_2}{2}}{C + \frac{C_1 + C_2}{2}}}$$

where a capacitor (C) is in the energy store and an inductance ($L_C$) is in the energy store.

6. Method as claimed in claim 1, wherein, if the intermediate circuit voltage mean value ($\overline{U_{DC}}$) matches the threshold value ($U_{DCS}$) which can be predetermined, the energy store is connected by means of the converter circuit from a connection (M) of the first capacitor ($C_1$) to the second capacitor ($C_2$).

7. An apparatus for carrying out a method for balancing a three-point DC voltage intermediate circuit having a converter circuit which is connected to a first capacitor ($C_1$) and to a second capacitor ($C_2$) of the three-point DC voltage intermediate circuit, and having a drive circuit which has a mean-value forming device for forming an intermediate circuit voltage mean value ($\overline{U_{DC}}$) from a first intermediate circuit voltage ($U_{DC1}$), which is present across the first capacitor ($C_1$) and from a second intermediate circuit voltage ($U_{DC2}$), which is present across the second capacitor ($C_2$), with the converter circuit being connected to the drive circuit,
wherein the drive circuit has a monitoring device for monitoring the intermediate circuit voltage mean value ($\overline{U_{DC}}$) for a threshold value ($U_{DCS}$) which can be predetermined, with the monitoring device being connected to the mean value forming device,
in that the converter circuit has a first drivable switch and a second drivable switch, in that an energy store is provided, which is connected to the first switch and to the second switch, and in that
the first switch and the second switch are connected to the drive circuit, in which case the first switch and the second switch can be connected to the first capacitor ($C_1$) and to the second capacitor ($C_2$).

8. The apparatus as claimed in claim 7, wherein the drive circuit has a first switching state output device and a second switching state output device, with the first switching state output device being connected to a first comparator in the monitoring device, and the second switching state output device being connected to a second comparator in the monitoring device.

9. The apparatus as claimed in claim 8, wherein the first switching state output device has a first monostable multivibrator with a time ($T_B$) which can be predetermined, for switching to a stable state, and has a second monostable multivibrator with a time ($T_B$), which can be predetermined, for switching to a stable state, with the first monostable multivibrator in the first switching state output device being connected to the first comparator, and
in that the second switching state output device has a first monostable multivibrator with the time ($T_B$), which can be predetermined, for switching to a stable state, and has a second monostable multivibrator with the time ($T_B$), which can be predetermined, for switching to a stable state, with the first monostable multivibrator in the second switching state output device being connected to the second comparator.

10. The apparatus as claimed in claim 9, wherein the time ($T_B$) which can be predetermined can be defined as a function of the values of the first capacitor ($C_1$), of the second capacitor ($C_2$) and of the energy store.

11. The apparatus as claimed in claim 10, wherein the time ($T_B$) which can be predetermined can be defined in accordance with the formula $$T_B = \Pi \cdot \sqrt{2L_c \cdot \frac{C \cdot \frac{C_1 + C_2}{2}}{C + \frac{C_1 + C_2}{2}}}$$

where a capacitor (C) is in the energy store and an inductance ($L_C$) is in the energy store.

12. The apparatus as claimed in claim 9, wherein the output of the first monostable multivibrator in the first switching state output device is connected indirectly to the second monostable multivibrator in the first switching state output device, and in that the output of the first monostable multivibrator in the first switching state output device is connected to an OR logic circuit in the first switching state output device.

13. The apparatus as claimed in claim 9, wherein the output of the first monostable multivibrator in the second switching state output device is connected indirectly to the second monostable multivibrator in the second switching state output device, and in that the output of the first monostable multivibrator in the second switching state output device is connected to an OR logic circuit in the second switching state output device.

14. The apparatus as claimed in claim 13, wherein the output of the second monostable multivibrator in the first switching state output device is connected to the OR logic circuit in the second switching state output device, and
in that the output of the second monostable multivibrator in the second switching state output device is connected to the OR logic circuit in the first switching state output device.

15. The apparatus as claimed in claim 14, wherein the drive circuit has an operating device for operating the first switch and the second switch, which operating device is connected to the output of the OR logic circuit in the first switching state output device, and to the output of the OR logic circuit in the second switching state output device.

* * * * *